United States Patent
McGee et al.

(10) Patent No.: US 7,586,842 B2
(45) Date of Patent: Sep. 8, 2009

(54) FAILOVER OF MULTICAST TRAFFIC FLOWS USING NIC TEAMING

(75) Inventors: Michael Sean McGee, Austin, TX (US); Darda Chang, Austin, TX (US); Nambi Madhi, Austin, TX (US); Matthew S. Reeves, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 11/711,944

(22) Filed: Feb. 27, 2007

(65) Prior Publication Data

US 2007/0268820 A1  Nov. 22, 2007

Related U.S. Application Data

(60) Provisional application No. 60/802,092, filed on May 19, 2006.

(51) Int. Cl.
  *H04J 1/16* (2006.01)
  *H04L 12/28* (2006.01)
(52) U.S. Cl. .................. 370/218; 370/390
(58) Field of Classification Search ............ 370/218, 370/390
See application file for complete search history.

(56) References Cited

U.S. PATENT DOCUMENTS

| | | | |
|---|---|---|---|
| 6,553,028 B1 * | 4/2003 | Tang et al. | 370/389 |
| 7,324,439 B2 * | 1/2008 | Loo | 370/217 |
| 7,337,350 B2 * | 2/2008 | Mimatsu et al. | 714/4 |
| 2002/0165982 A1 * | 11/2002 | Leichter et al. | 709/244 |
| 2003/0142670 A1 * | 7/2003 | Gould et al. | 370/390 |
| 2004/0100970 A1 * | 5/2004 | Gerdisch et al. | 370/395.53 |
| 2005/0195818 A1 * | 9/2005 | Hasegawa et al. | 370/390 |
| 2006/0120396 A1 * | 6/2006 | Hasegawa et al. | 370/432 |
| 2006/0176804 A1 * | 8/2006 | Shibata | 370/217 |
| 2006/0179188 A1 * | 8/2006 | Mimatsu et al. | 710/65 |
| 2006/0229896 A1 * | 10/2006 | Rosen et al. | 705/1 |
| 2007/0041327 A1 * | 2/2007 | Foster et al. | 370/242 |
| 2007/0183418 A1 * | 8/2007 | Riddoch et al. | 370/389 |

\* cited by examiner

*Primary Examiner*—Andrew Lee

(57) ABSTRACT

A method of operating a network computer system provides redundant Internet Protocol (IP) Multicast traffic flow on a group of physical ports and comprises virtualizing the group of physical ports into a single virtual Network Interface Controller (NIC), validating network connectivity in a logical group comprising at least one of the physical ports in the virtualized group, and responding to failure of a physical port that is actively receiving on an IP Multicast traffic flow by instigating failover of the actively received IP Multicast traffic flow to a physical port in the logical group with validated network connectivity.

20 Claims, 6 Drawing Sheets

Table I

| Initial IP Address | 239 | 255 | 255 | 1 |
|---|---|---|---|---|
| To Binary -> | 1110 1111 | 1111 1111 | 1111 1111 | 0000 0001 |
| Take 23 least significant bits | | 111 1111 | 1111 1111 | 0000 0001 |
| Convert to hex | | 7f | ff | 01 |
| Append to Ethernet Address | 01-00-5e | 7f | ff | 01 |

FIG. 6

FAILOVER OF MULTICAST TRAFFIC FLOWS USING NIC TEAMING

BACKGROUND

A network is most useful if connections, such as links between clients and network servers, are reliable and network devices, for example servers, can quickly receive and respond to numerous incoming requests from clients or other devices on the network. As processing speeds increase and memory access time decreases in servers and other network devices, throughput at device interfaces to the network can become a bottleneck. Network reliability and throughput can be improved by coupling some or all of the network devices to the network through redundant network resources. Redundant network links may be formed using multiple single-port Network Interface Controllers (NICs), one or more NICs each having more than one port, or a combination of single and multiple port NICs. Network interface resources can be teamed to improve throughput and reliability. Resource teams typically include two or more NICs, or two or more NIC ports, which are logically coupled in parallel to appear as a single virtual network adapter to the other network devices. Resource teams can supply aggregated throughput of data to and from a network device employing the team and/or fault tolerance with resource redundancy enabling an increase in reliability.

Fault tolerant teams of network resources can employ two or more network adapter or NIC ports with one port "active" and configured to operate as a "primary," and other members of the team designated as "secondary" and configured to operate in a "standby" mode. A NIC or NIC port in standby mode is usually idle. Typically activity may be limited to an extent sufficient to respond to system test inquiries or heartbeats which indicate to the team that the NIC or port remains operational. The NIC or port in standby may be activated to replace the primary adapter upon failure. Thus, interruption of a network connection to a critical server may be avoided notwithstanding the existence of a failed network adapter card or port.

Failover is a capability to switch automatically to a secondary resource, typically a redundant or standby network resource, upon failure or abnormal termination of a previously active primary resource.

SUMMARY

An embodiment of a method for operating a network computer system provides redundant Internet Protocol (IP) Multicast traffic flow on a group of physical ports. The method comprises virtualizing the group of physical ports into a single virtual Network Interface Controller (NIC), validating network connectivity in a logical group comprising at least one of the physical ports in the virtualized group, and responding to failure of a physical port that is actively receiving on an IP Multicast traffic flow by instigating failover of the actively received IP Multicast traffic flow to a physical port in the logical group with validated network connectivity.

BRIEF DESCRIPTION OF THE DRAWINGS

Embodiments of the invention relating to both structure and method of operation may best be understood by referring to the following description and accompanying drawings:

FIG. 6 is a table showing an example of IP to Ethernet conversion.

DETAILED DESCRIPTION

Several methods can provide redundancy for Internet Protocol (IP) Multicast traffic flows on a group of physical ports representing a single virtual Network Interface Controller (NIC) port in an application of NIC teaming. The methods enable a computer system to recover from hardware or software failures and proactively instigate failover of an incoming IP Multicast stream to another NIC port in the logical group that has validated network connectivity.

A teaming driver proactively updates a switched network after failure of a team member to enable multicast streams to be redirected to a validated receive path for the team.

The teaming driver tracks membership in multicast groups for each team to proactively update the network for each multicast stream.

A teaming driver can use one of multiple techniques or may combine techniques for managing failover.

In a first example failover technique, a teaming driver may "track" membership on a per-multicast flow basis. The teaming driver can maintain a list of multicast IP addresses that are received by the driver while receiving a multicast flow. After failure of the team member that is actively receiving on the multicast flow, the teaming driver proactively informs the switched network via Internet Group Management Protocol (IGMP) that the multicast flow should be assigned to a new port for the team.

In a second example failover technique, a teaming driver can use IGMP's "general query" functionality. After failure of a team member, the teaming driver sends up to a higher level protocol an IGMP General Query. The query requests the protocol stack to send an IP Join message or messages from the protocol stack and transmit the IP Join message or messages to the switched network.

The techniques enable a team that is receiving one or more multicast flows to maintain full multicast connectivity even after a team member has failed. The technique enables failover without any manual intervention on the part of a system user or administrator.

The failover techniques can be used for NIC teaming applications that are "IGMP aware" and proactively affect failover of multicast flows from a bad receive path to a good receive path.

Figure 1:
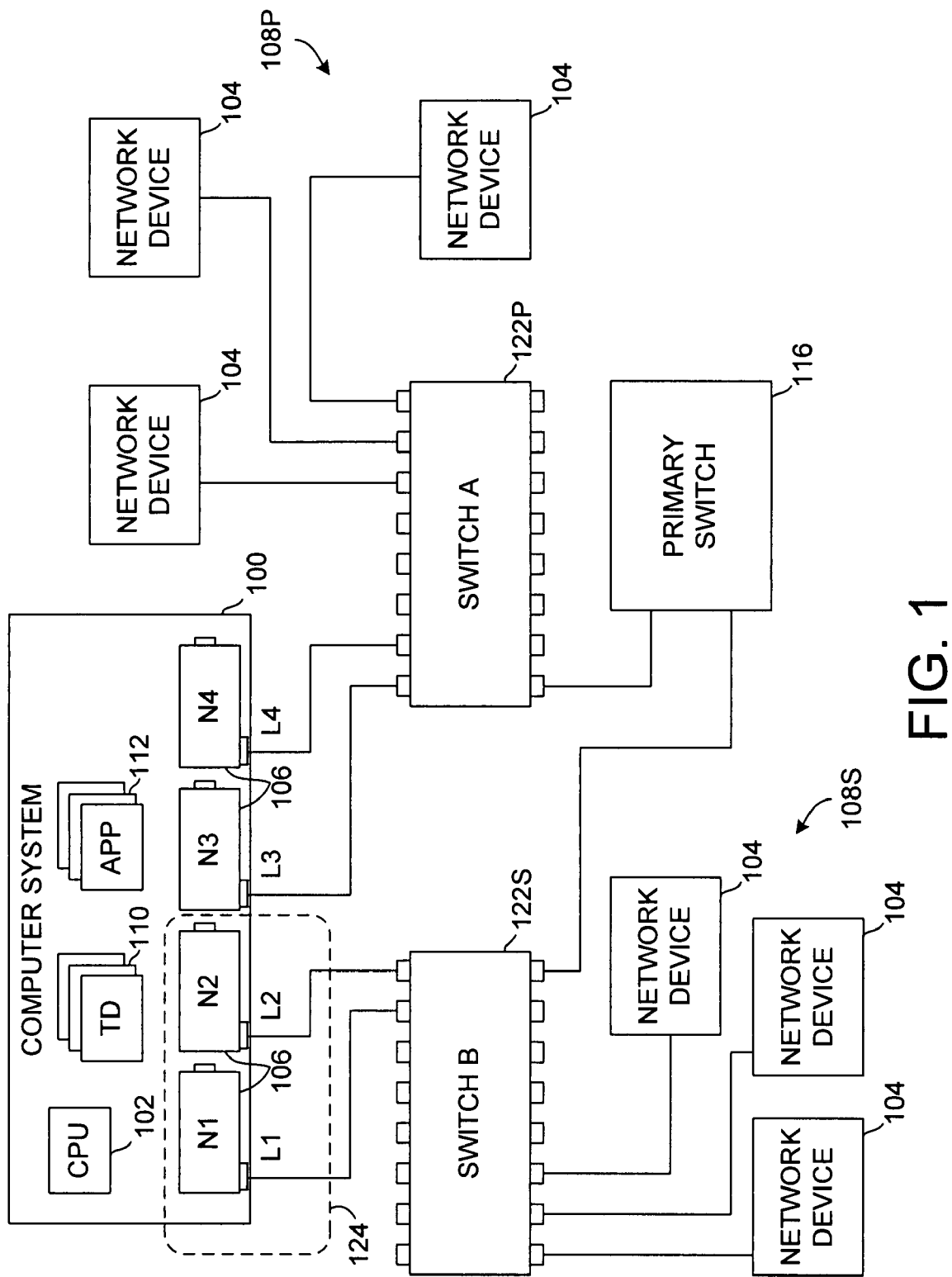
FIG. 1 is a schematic block diagram showing an embodiment of a network computer system that can be configured to provide redundant Internet Protocol (IP) Multicast traffic flow on a group of physical ports.

Referring to FIG. 1, a schematic block diagram illustrates an embodiment of a network computer system 100 that can be configured to provide redundant Internet Protocol (IP) Multicast traffic flow on a group of physical ports 106. The illustrative computer system 100 comprises processing resources 102 configured to control and communicate with one or more network devices 104 and a plurality of network resources 106 coupled by links between the processing resources 102 and the network device 104. The computer system 100 further comprises teaming drivers 110 and/or applications 112 which are executable on the processing resources 102 and are adapted to manage redundant Internet Protocol (IP) Multicast traffic flow on a group of network resources 106. The processing resources 102 operate the network resource group as a single virtual interface controller 124 and determine network connectivity of network resources 106 within the network resource group. The processing resources 102 respond to failure of a network resource that is actively receiving the IP Multicast traffic flow by initiating failover of the IP Multicast traffic flow to another network resource within the network resource group that has current network connectivity.

The teaming drivers 110 and/or applications 112 can determine network resource connectivity by tracking membership of network resources 106 in the network resource group on a per Multicast flow basis and maintaining a list of Multicast Internet Protocol (IP) addresses at which the Multicast flow is received.

Upon failure detection, the teaming drivers 110 and/or applications 112 initiate failover of the actively received IP Multicast traffic flow by communicating a request to assign the IP Multicast traffic flow via Internet Group Management Protocol (IGMP). The assignment request directs the IP Multicast flow from a first network resource to a second network resource.

In a particular example application, the teaming drivers 110 or applications 112 respond to failure of a network resource using the Internet Group Management Protocol (IGMP) to communicate a general query that requests an Internet Protocol (IP) stack to send an IGMP join message and identifies an IP Multicast traffic flow to be received. The teaming drivers 110 or applications 112 receive IGMP join messages in response to the general query and transmitting the received IGMP join messages.

For example, during monitoring of Internet Group Management Protocol (IGMP) traffic, a list of joined multicast streams can be maintained based on the monitored traffic. In response to failover, the teaming drivers 110 or applications 112 can send one or more Internet Group Management Protocol (IGMP) reports containing the list of joined multicast streams out a primary aggregation group and retain joined groups on non-primary aggregation groups.

In some embodiments, the multicast streams are joined on a new primary aggregation group before failover from a previous aggregation group. After failover, the teaming drivers 110 send at least one leave group message from the previous primary aggregation group, thereby ensuring termination of the multicast streams.

A control process executable as part of the teaming drivers 110 and/or applications 112 monitors to detect a failover condition and determine link connectivity. For a connected link, the control process sends one or more Internet Group Management Protocol (IGMP) Leave Group messages that terminate multicast streams to ports outside the new primary aggregation group. For a disconnected link, the control process sets a signal or message directed to the previous primary aggregation group indicative that an Internet Group Management Protocol (IGMP) Leave Group message is pending. The control process, upon detecting that link connectivity is renewed, sends one or more Internet Group Management Protocol (IGMP) Leave Group messages so that multicast streams directed to ports outside the new primary aggregation group are terminated.

A control process can also execute in the processing resources 102 that snoops IGMP frames on the primary aggregation group, caches the most recently sent of the IGMP frames. Upon realizing that a failover condition has occurred, the control process sends the cached last sent frame of the IGMP frames enabling IGMP) traffic on the new primary aggregation group.

In the illustrative system configuration, network resources 106 include multiple Network Interface Controllers (NICs) that enable the computer system 100 to communicate through one or more ports with other network devices 104 to which NIC ports are coupled. Computer system 100 may be connected to at least as many networks as the number of NICs or NIC ports 106. Multiple NICs or NIC ports 106 are can be coupled to the same network as a team, each supplying a separate and redundant link to the same network for operations such as load balancing and/or fault tolerance. In some arrangements, two or more NICs or NIC ports 106 can be split between distinct paths or segments of a network that ultimately connect to the single core switch 116.

In a packet-switched network, individual NICs 106 transmit and receive packets such as Ethernet™ or other formatted packets from the network. The packets are generated by processing resources 102 of a transmitting network device 104. Packet formatting is defined by a selected transmission protocol. Individual network devices 104 use one or more unique addresses for communication with other network devices 104. An address corresponds to one of the layers of the Open Source Initiative (OSI) model and is embedded in the packets for both a source device and a destination device. Typically, a device uses an address at layer 2, a data link layer known as a Media Access Control (MAC) address, and an address at layer 3, a network layer known as a protocol address such as Internet Protocol (IP), Inter network Packet eXchange (IPX), AppleTalk and the like. The MAC address can be considered as assigned to physical hardware of the device, for example the adapter or NIC port supplying a link to the network. In contrast, the protocol address is assigned to device software. When multiple protocols reside on the same network device, a protocol address is usually assigned to each resident protocol.

For Ethernet™ networks, devices communicate directly using respective MAC addresses, although software for individual devices initiate communication with one or more other network devices 104 using the protocol addresses. Ethernet™ devices first ascertain the MAC address corresponding to a particular protocol address identifying a destination device, for IP protocol by first consulting a cache of MAC address/protocol address pairs maintained by each network device. If an entry for a particular protocol address is missing, a process is initiated whereby the sending device broadcasts a request to all devices on the network for the device having the destination protocol address to send back the MAC address, an operation called Address Resolution Protocol (ARP), with the result stored in the cache. Packets are formed by embedding source and destination addresses, and by embedding the source and destination protocol addresses in a packet payload enabling the receiving device to respond to the correct source. IPX protocol does not require the ARP process because the MAC address is included in the IP address.

Three types of layer 2 and layer 3 addresses exist. A directed or unicast packet includes a specific destination address that corresponds to a single network device. A multicast address corresponds to multiple but not all devices on a network. A broadcast address, for example as used in the ARP process, corresponds to all devices on the network. A broadcast bit is set for broadcast packets, where the destination address is all ones. A multicast bit in the destination address is set for multicast packets.

The illustrative layer 2 network includes two contiguous paths 108P and 108S to core switch 116. Computer system 100 communicates with one or more other devices through a switch 122P over path 108P and other network devices through a switch 122S over path 108S. The network devices may be of any type, such as another computer system, a printer or other peripheral device, any type of network device, such as a hub, a repeater, a router, and the like. Multiple port switches 122S, 122P can be a concentrator, hub, switch or the like.

Computer system 100 is shown coupled to ports of the network device switch 122P by way of links L3 and L4. The computer system 100 is also shown coupled to the network device switch 122S via links L1 and L2. NICs 106 are shown to supply one NIC port, and thus one link, for each NIC. NICs may otherwise be multi-port devices or a combination of both single and multi-port NICs. Computer system 100 may be coupled to the network devices via any number of links from one to some maximum number such as sixteen, primarily limited by the number of expansion slots available.

Teamed interface resources in computer system 100 can supply two or more redundant links to the contiguous network segment that includes two paths 108P, 108S to a core switch 116 through redundant switches 122P and 122S respectively. In the example members of a team, for example ports for NICs N1-N4, are equally divided between the two paths of the segment. The team of ports or NICs N1-N4 can perform operations such as load balancing and/or fault tolerance, depending upon whether the team is configured to be a TLB or NFT team respectively. Teaming of two or more NIC ports can be configured to make the team perform like a single virtual interface resource or virtual port to the other devices on the same network or sub-network, for example by assigning one primary MAC address and one protocol address to the entire team.

Figure 2:
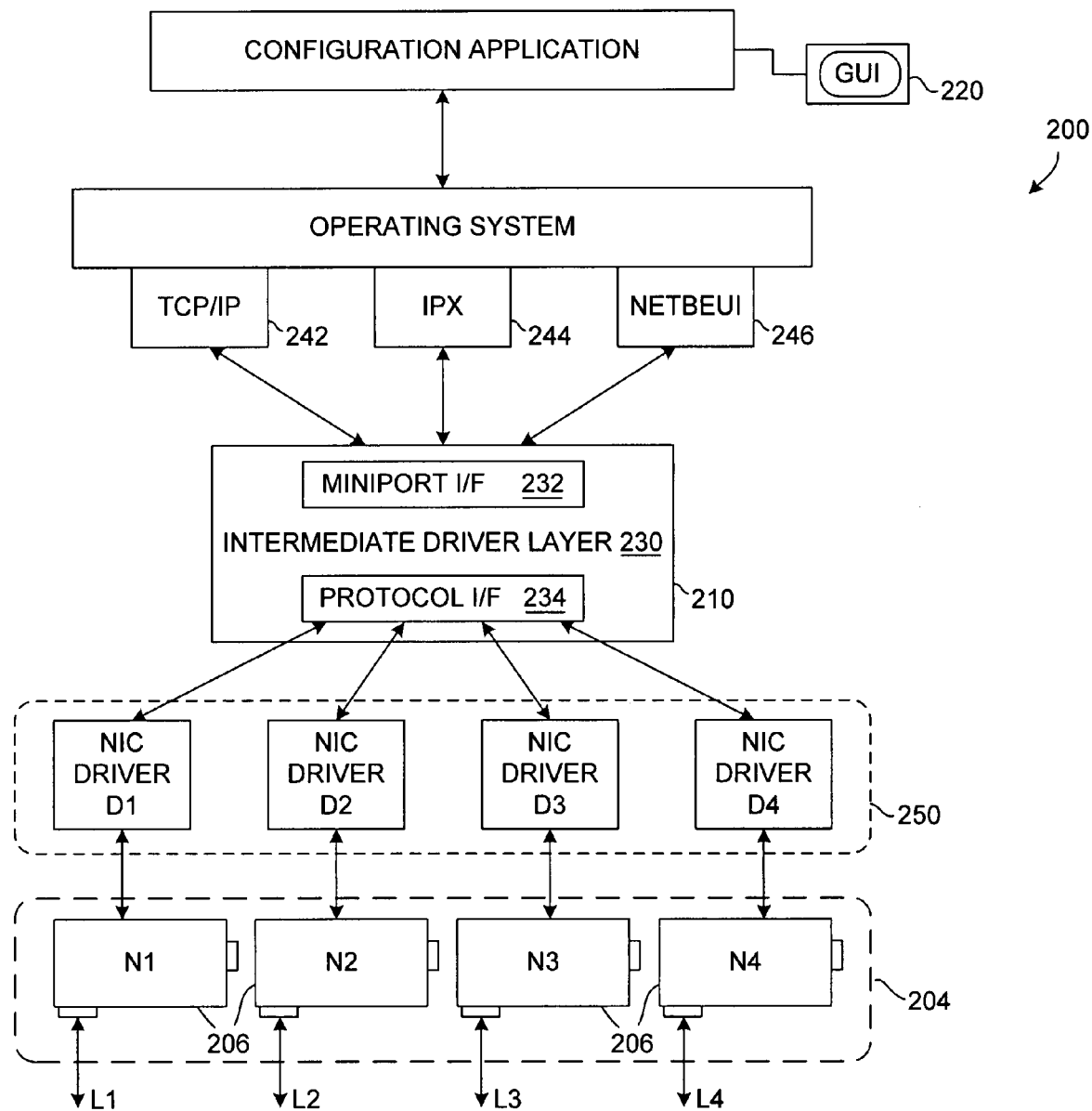
FIG. 2 is a schematic block diagram illustrating primary components of an embodiment of a controller system installed on the computer system that can be configured to provide redundant Internet Protocol (IP) Multicast traffic flow on a group of physical ports.

Referring to FIG. 2, a schematic block diagram illustrates primary components of an embodiment of a controller system installed on the computer system 200 that can be configured to provide redundant Internet Protocol (IP) Multicast traffic flow on a group of physical ports. The teaming drivers 210 operate a teaming mechanism whereby a team of network adapter ports can function as a single virtual adapter. Network devices 204 communicate with the team using one layer 2 address and one layer 3 address. A network device 204 "sees" only one layer 2 address such as a MAC address and one protocol address such as IP or IPX for a team regardless of the number of adapter ports that make up the team. For the IP protocol address of an Ethernet network, a team has only one entry in an ARP table, for example one MAC address and one IP address, for the entire team.

The depicted computer system 200 is configured with network resources 206 including four NICs N1-N4 and instantiations of associated drivers D1, D2, D3 and D4. Each instantiation of a driver D1 through D4 is the driver suitable to control each of the single-port NICs N1-N4. Drivers D1-D4 may be instances of the same driver if NICs N1-N4 are identical, or drivers D1-D4 may be different if associated NICs N1-N4 is also different.

An embodiment of a configuration application includes a graphical user interface (GUI) 220 through which users program configuration information regarding teaming of the NICs. The configuration application can also receive current configuration information from the teaming driver 210 that can be displayed to the user using the GUI 220, including resource status for the team from among the statuses "failed," "standby," and/or "active". GUI 220 supports commands by which resources can be allocated to teams and configured.

A hierarchy of layers within the operating system performs a distinct function and passes information between one another and enables communication with an operating system of another network device over the network. In an illustrative example, four layers can be added to the operating system including a Miniport interface (I/F) Layer 232, a Protocol I/F Layer 234, an Intermediate Driver Layer 230 and a Network Driver Interface Specification (NDIS). The Protocol I/F Layer 234 supplies protocol addresses, translates protocol addresses to MAC addresses, and forms an interface between protocol stacks 242, 244, and 246 and the NDIS layer. Drivers for controlling the network adapter or NIC ports reside at the Miniport I/F Layer 232. The NDIS layer in combination with the operating system handle communications between the Miniport Driver Layer 232 and the Protocol I/F Layer 234.

The multiple network adapters can be teamed by interposing an intermediate driver residing at the Intermediate Driver Layer 230 between the Miniport Driver Layer 232 and the NDIS. Intermediate drivers in the Intermediate Driver Layer 230 do not actually control any hardware but rather create a group of miniport drivers for each of the NIC ports to be teamed. The intermediate drivers cause NIC drivers of a team to appear to be one NIC driver controlling one NIC port. Prior to introduction of teaming and the intermediate driver layer 230, a protocol address typically was assigned to each individual network adapter or NIC driver at the Miniport Driver Layer 232. In contrast, for a teaming implementation, a single protocol address is typically assigned to each instance of the intermediate driver, assigning a single protocol address to each team. A separate instance of the intermediate driver at the Intermediate Driver Layer 230 is allocated for each team of NIC adapter ports, each instance being used to tie together NIC drivers that correspond to the NIC ports belonging to the team.

Accordingly, the intermediate driver 230 appears as a single NIC driver to each of the protocols 242-246. Also, the intermediate driver 230 appears as a single protocol to each of the NIC drivers D1-D4 and corresponding NICs N1-N4. The NIC drivers D1-D4 and the NICs N1-N4 are bound as a single team 250. Because each instance of the intermediate driver can be used to combine two or more NIC drivers into a team, a user may configure multiple teams of any combination of the ports of the NICs currently installed on the computer system 200. By binding two or more drivers corresponding to two or more ports of physical NICs, data can be transmitted and received through one of the two or more ports in the case of an NFT team, or transmitted through all of the two or more ports and received through one for a TLB team, with protocol stacks interacting with what appears to be only one logical device.

A fault tolerant team is typically used when throughput of a single NIC port is sufficient but fault tolerance is important. For example, the NIC ports supplying redundant links L1 through L4 to the network can be configured as a network fault tolerance (NFT) team. For an NFT team, one of the links, for example link L1 of a first port of a corresponding NIC N1, is initially designated to operate as the primary and is therefore "active." The assignment can be accomplished by default. For example, the teaming driver 230 simply chooses the team member located in the lowest numbered slot as the primary member. Assignment of the primary can also be accomplished by a user manually dictating the choice to the teaming driver 230 through the GUI. In the default example depicted, the second through fourth links of the team L2-L4 supplied by the ports P2-P4 by NICs N2 and N3) are configured to operate as "secondary" members and as such are placed in a "standby" mode.

Accordingly, the primary member transmits and receives all packets on behalf of the team. If the active link such as L1 fails or is disabled for any reason, the computer system 200 can detect the failure and switch to one of the secondary links by rendering to the active and primary link of the team while placing the failed link L1 in failed mode, designated as a secondary resource. The process is sometimes called "failover." Communication between computer system 100 and devices 104, 116 in FIG. 1 is thereby maintained without significant interruption.

Figure 3:
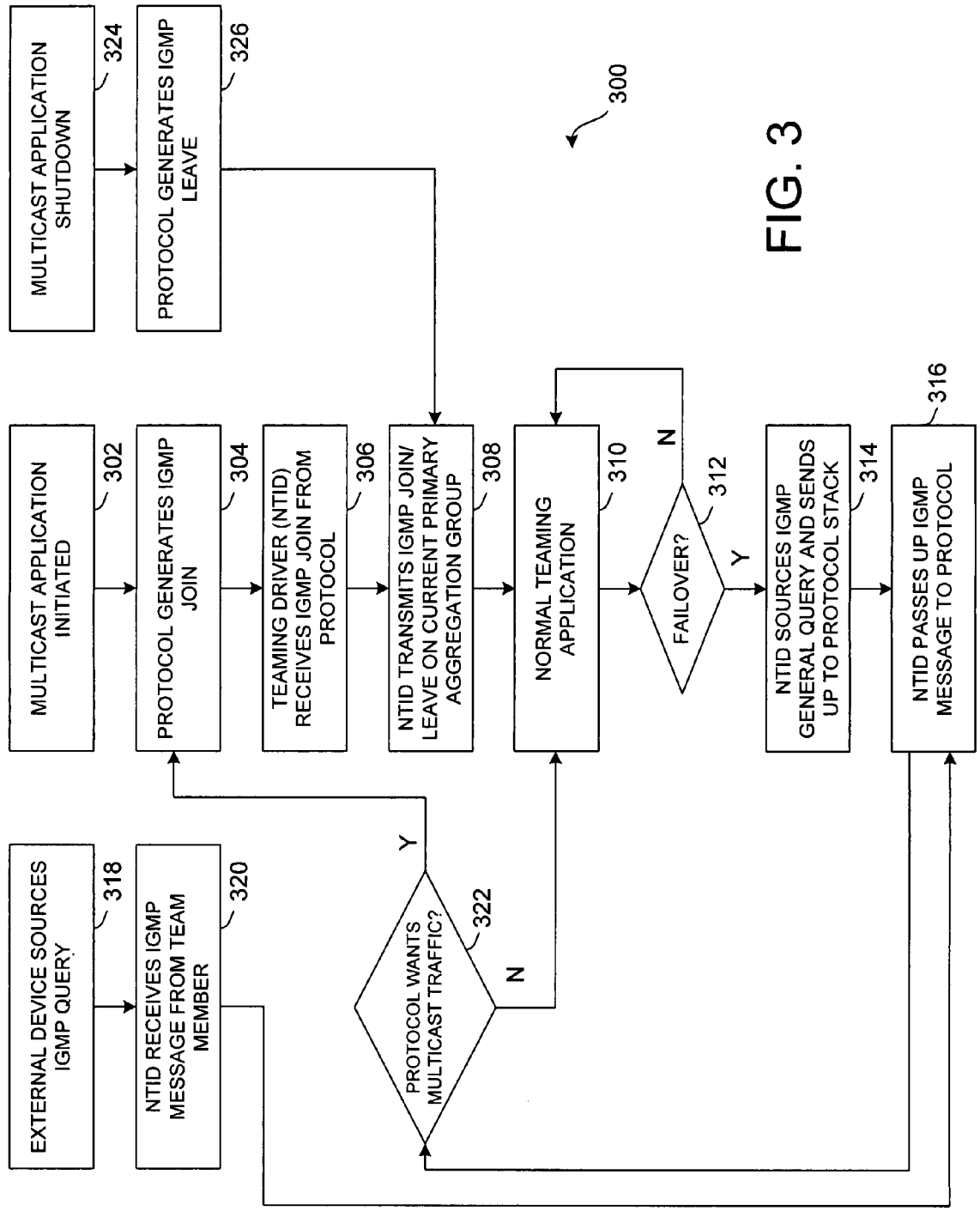
FIG. 3 is a flow chart showing an embodiment of a method for handling failover of multicast traffic flows using Network Interface Controller (NIC) teaming.

Referring to FIG. 3, a flow chart illustrates an embodiment of a method 300 for handling failover of multicast traffic flows using Network Interface Controller (NIC) teaming. A multicast application is initiated 302 and the protocol generates 304 an Internet Group Management Protocol (IGMP) join. A Network Teaming Intermediate Driver (NTID) receives 306 the IGMP join from the protocol and transmits 308 an IGMP join/leave on the current primary aggregation group, enabling normal teaming operation 310. In the absence of failover 312, normal teaming operation 310 continues.

In the event of failover, the NTID sources 314 an IGMP general query and sends the query to the protocol stack. The NTID passes 316 up the IGMP message to the protocol. If the protocol wants multicast traffic 322, the protocol generates 304 the IGMP join. Otherwise normal teaming operation continues 310.

In a condition that an external device sources 318 an IGMP query, the NTID receives 320 the IGMP message from the team member and passes 316 the IGMP message to the protocol 316.

In a condition of multicast application shutdown 324, the protocol generates 326 an IGMP leave, and the NTID transmits 308 the IGMP join/leave on the current primary aggregation group.

Figure 4:
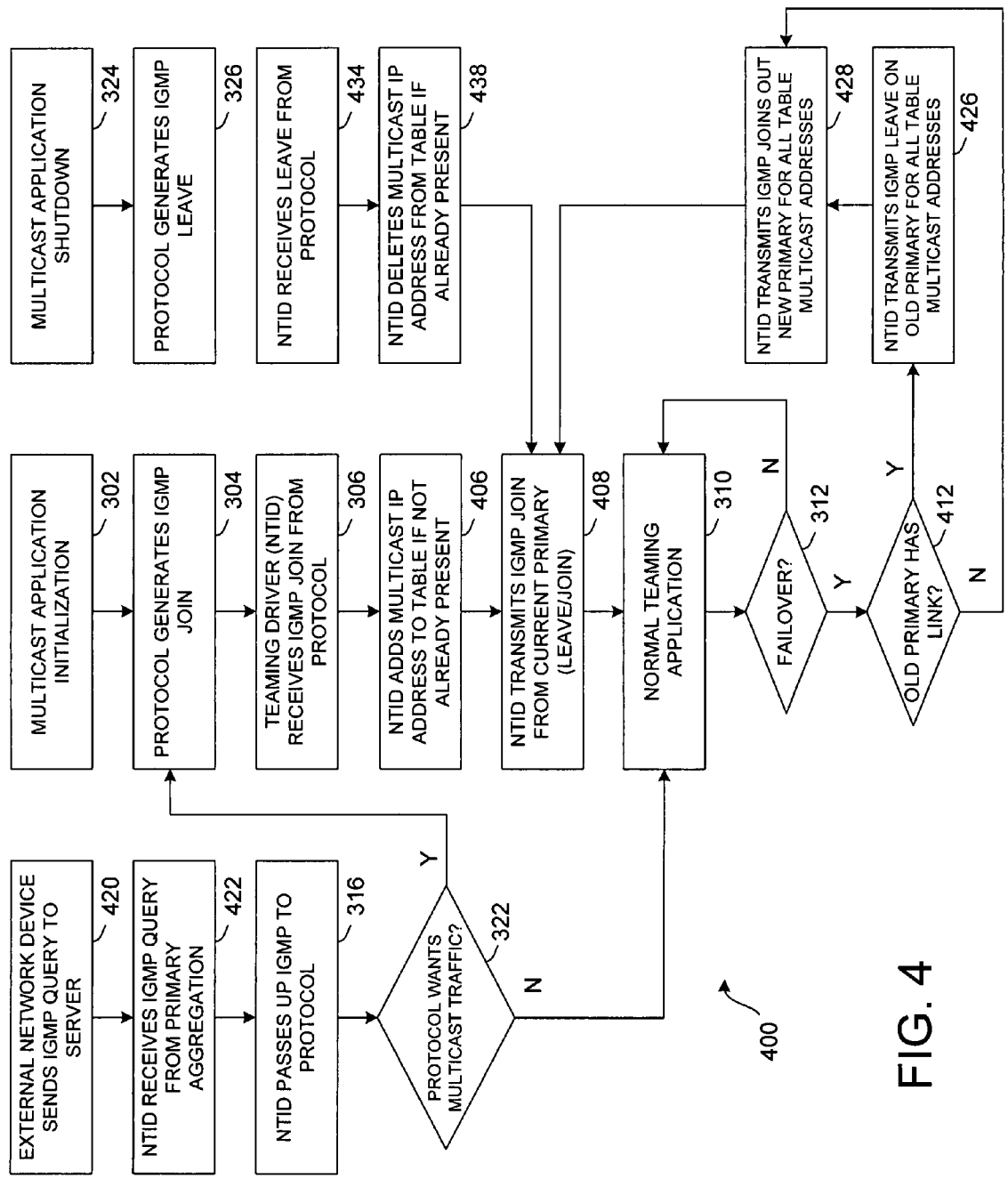
FIG. 4 is a flow chart that depicts another embodiment of a method for handling failover of multicast traffic flows using Network Interface Controller (NIC) teaming.

Referring to FIG. 4, a flow chart illustrates another embodiment of a method 400 for handling failover of multicast traffic flows using Network Interface Controller (NIC) teaming. A multicast application is initiated 302 and the protocol generates 304 an Internet Group Management Protocol (IGMP) join. A Network Teaming Intermediate Driver (NTID) receives 306 the IGMP join from the protocol and adds 406 a multicast IP address to the table if not already present. The NTID transmits 408 an IGMP join out the current primary in a leave/join operation, enabling normal teaming operation 310. In the absence of failover 312, normal teaming operation 310 continues.

If failover occurs and the old primary maintains a link 412, then the NTID transmits 426 an IGMP leave on the old primary for all multicast addresses in the table, transmits 428 IGMP joins out the new primary for all multicast addresses in the table, and transmits 408 an IGMP join out the current primary before continuing normal teaming operation 310.

If failover occurs and the old primary does not maintain a link, then the NTID transmits 428 IGMP joins out the new primary for all multicast addresses in the table, and transmits 408 an IGMP join out the current primary before continuing normal teaming operation 310.

In a condition that an external network device sends 420 an IGMP query to a server, the NTID receives 422 the IGMP message from the primary aggregation and passes 316 the IGMP message to the protocol 316. If the protocol wants multicast traffic 322, the protocol generates 304 the IGMP join. Otherwise normal teaming operation continues 310.

In a condition of multicast application shutdown 324, the protocol generates 326 an IGMP leave, and the NTID receives 434 a leave from the protocol, deletes 438 the multicast IP address from the table if already present, and transmits 408 an IGMP join out the current primary before continuing normal teaming operation 310.

Various embodiments and aspects of a method for failover of multicast traffic flows in a computer system using Network Interface Controller (NIC) teaming can be implemented. For example, redundant Internet Protocol (IP) Multicast traffic flow can be created on a group of physical ports by virtualizing the group of physical ports into a single virtual Network Interface Controller (NIC) and validating network connectivity in a logical group that includes one or more of the physical ports in the virtualized group. In response to failure of a physical port that is actively receiving on an IP Multicast traffic flow, failover of the actively received IP Multicast traffic flow is instigated and directed to a physical port in the logical group that maintains validated network connectivity.

In some conditions or embodiments, network connectivity in the logical group can be validated by tracking membership of physical ports in the logical group on a per Multicast flow basis. Similarly, network connectivity in the logical group can be validated by maintaining a list of Multicast Internet Protocol (IP) addresses at which the Multicast flow is received.

Failover of the actively received IP Multicast traffic flow can be instigated by communicating a request to assign the IP Multicast traffic flow from a first physical port to a second physical port. In an illustrative configuration, the request can be communicated via Internet Group Management Protocol (IGMP).

Response to failure of a physical port can comprise communicating a general query that requests an IP stack to send an IGMP join message and identifies an IP Multicast traffic flow to be received. In some configurations, the request can be communicated using IGMP. IGMP join messages elicited by the general query are received and transmitted to a switched network.

A particular example embodiment of a failover method includes monitoring or tracking traffic information to determine a suitable failover response. Internet Group Management Protocol (IGMP) traffic is monitored and a list of joined multicast streams is maintained based on the monitored IGMP traffic. In response to failover, one or more IGMP reports are sent out a primary aggregation group. The IGMP reports contain a list of joined multicast streams. Joined groups are retained on non-primary aggregation groups.

The multicast streams can be joined on a new primary aggregation group before failover from a previous aggregation group. After failover, one or more leave group message can be sent from the previous primary aggregation group, ensuring termination of the multicast streams.

In another embodiment of a failover method, in the event of a failover condition, link connectivity is determined. For a connected link, one or more IGMP Leave Group messages are sent so that multicast streams to ports outside the new primary aggregation group are terminated. For a disconnected link, an indication directed to the previous primary aggregation group is sent showing an IGMP Leave Group message is pending. When renewed link connectivity occurs, one or more IGMP Leave Group messages are sent so that multicast streams to ports outside the new primary aggregation group are terminated.

In some implementations the IGMP frames on the primary aggregation group can be snooped and the last sent frame of the IGMP frames can be cached. When a failover condition occurs, the cached last sent frame of the IGMP frames is sent, enabling Internet Group Management Protocol (IGMP) traffic on the new primary aggregation group.

Figure 5:
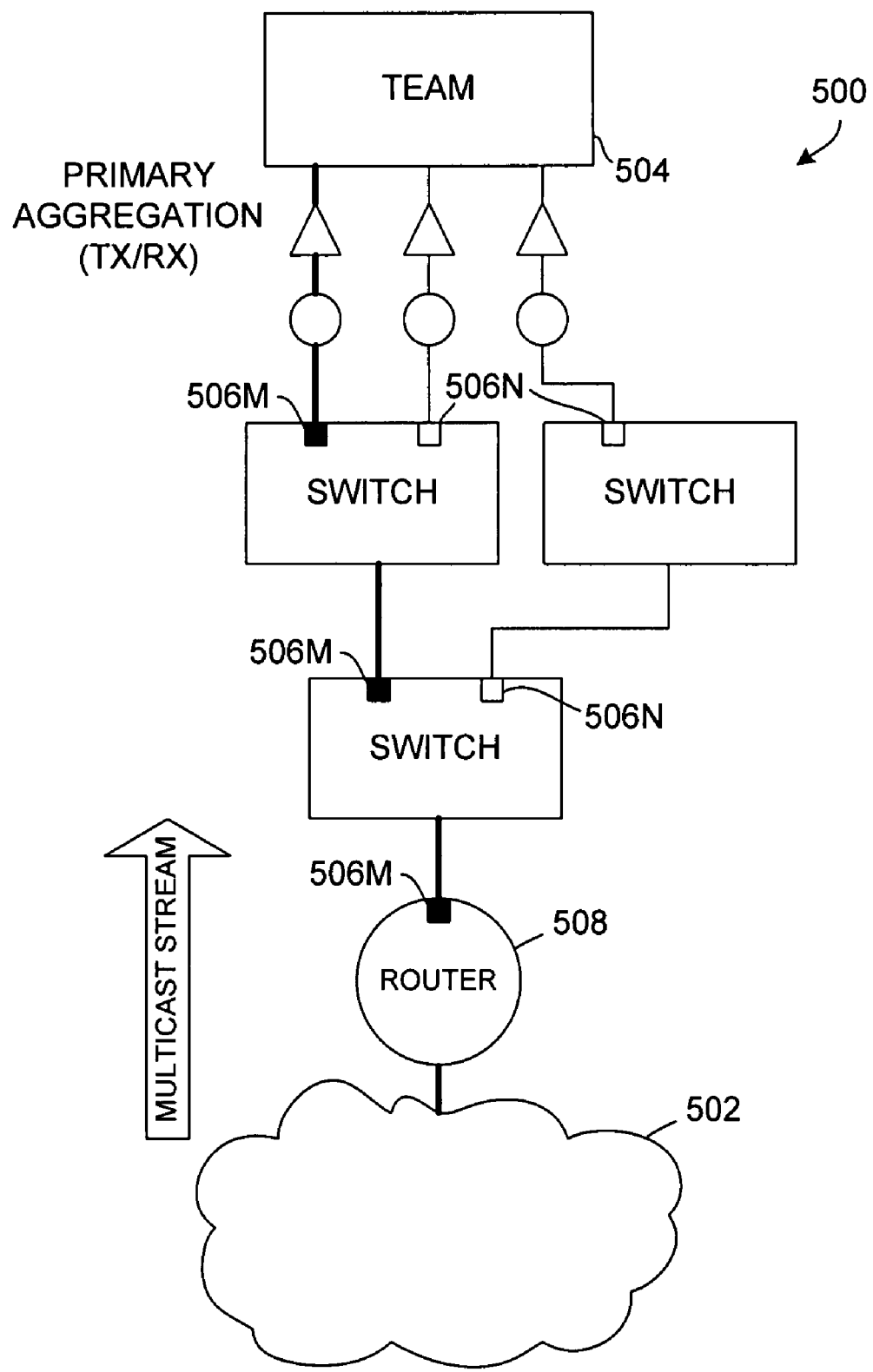
FIG. 5 is a schematic block diagram illustrating teaming usage of Internet Group Management Protocol (IGMP) to register dynamic multicast group membership.

Referring to FIG. 5, a schematic block diagram illustrates teaming usage of Internet Group Management Protocol (IGMP) to register dynamic multicast group membership. Data streams in a communication system 500 are shown from a network 502 to a team 504. Teaming system behavior can be analyzed as a server joins a multicast group using IGMP. In an example of team operation, team data can be sent to each member port 506M. IGMP traffic is not sent to nonmember ports 506N which are not members of the multicast group.

In a description of IGMP behavior, multicast routers 508 send Queries to hosts to determine which hosts consent to be part of that group. Hosts then send a Report informing the network device which multicast groups are consented to be joined. A host sends a Report immediately upon consenting to join a group and does not wait for a Query. The host repeats the send once or twice in case of the initial is dropped.

Some hosts, for example called IGMPv1 hosts, may silently leave a group by not responding to a Query. Other hosts, illustratively IGMPv2 and IGMPv3 hosts, may issue a leave group message to immediately leave a multicast group.

Examples of IGMP messages and types may be defined. "Version 2 Leave Group" message has type 0x17. "Membership Query" message has type 0x11. "Version 1 Report" message has type 0x12. "Version 2 Report" message has type 0x16. "Version 3 Report" message has type 0x22. An IGMP message is the first 8-bytes after an IP header. The first byte in the message contains the type of IGMP message.

The messages can be defined by the define statements such as QUERY, LEAVE, and REPORT.

Various operating systems support different versions of IGMP. For example, IGMPv1 is supported by Windows NT™ 3.51 and higher, IGMPv2 is supported by Windows NT™ 4.0 and Windows™ 2000, IGMPv3 is supported by Windows™ 2003.

The failover techniques disclosed herein extend capabilities of a teaming driver to take IGMP messages into consideration. The server may run an application that can join a multicast group. The join message is then sent out the primary aggregation, causing the aggregation and all ports on network devices along the path to become part of the multicast group. In the case of a failover scenario, the new team member will be connected to another port or even another network device. The new primary will be unable to receive data from the multicast stream until a timeout occurs and a network device re-sends a query to join the group, which could be several minutes.

During the failover, if the IGMP report is sent out the new primary, causing the new primary to join the multicast group, and the old primary aggregation is no longer connected to the switch but is re-connected before the port times out the status of the multicast group. The traffic continues to come down a nonprimary port. The traffic is dropped by a Network Teaming Intermediate Driver (NTID) but what is desired is to maintain groups on any ports upon which the multicast stream is not received.

The illustrative failover techniques ensure the team can maintain connectivity with the multicast group in a failover. NTID will monitor all outgoing IGMP traffic and maintain a list of all joined multicast streams. When a failover occurs, NTID will send IGMP reports containing the list of joined multicast streams out the primary aggregation group. NTID will also leave all joined groups on non-primary aggregation groups.

An efficient technique for a failover scenario has a seamless transition from the old primary to the new primary. For IGMP multicast groups, NTID will join the multicast group on the new primary before the failover actually occurs. After the failover has occurred, the old primary will send leave group messages to ensure the multicast does not continue to be sent to any other team member. If a leave group message cannot be sent due to link loss, a flag will be set on the aggregation group that an IGMP leave group message is pending. When the link is returned, the leave group message will be sent from the aggregation. In case of a fail-back, the leave group will still be sent, but a report will be sent immediately after during the failover logic.

Another difficulty addressed by the disclosed failover techniques involves operation of the Network Teaming Intermediate Driver (NTID) to load balance IGMP messages in team types such as Transmit Load Balancing (TLB). A result is that when multiple multicast streams are used, several streams may be transmitted on non-receiving team members. The team then cannot receive data from the multicast streams on the non-receiving team members.

NTID will not load balance IGMP traffic. Instead, for the illustrative failover techniques all IGMP traffic will be sent out the primary aggregation group.

The Network Configuration Utility (NCU) is configured for failover of multicast traffic flows using NIC teaming by writing the registry key with the default value.

In an example embodiment, the illustrative failover technique can be implemented by adding to a context data structure.

A variable can be added to the aggregation group context to determine whether a leave group command is still pending on a particular aggregation. The value will be set in a failover if the old primary loses link and the leave group command cannot be transmitted. When the old primary is reconnected, the leave group command will be sent immediately before any failover scenarios occur.

The IP Header portion of a packet contains a 'protocol' field. IGMP for user Authentication Protocol (IGAP), IGMP, Router port Group Management Protocol (RGMP), and Distance Vector Multicast Routing Protocol (DVMRP) frames contain a value of 0x2 for the IP Header field. IGMP is the base protocol and all others are variants. IGAP is based on IGMPv2 but adds user authentication to join multicast groups. RGMP is based on IGMP for use between multicast routers and switches to restrict multicast packet forwarding in switches to those routers where the packets may be needed. RGMP is designed for backbone switched networks where multiple, high speed routers are interconnected. DVMRP is based on Distance Vector or Bellman-Ford technology and routes multicast datagrams only, and does so within a single Autonomous System. DVMRP is an implementation of the Truncated Reverse Path Broadcasting algorithm (DVMRP, IGMP-IP Protocol).

An IGMP_MESSAGE structure holds IGMP message information and can specify a message type, a maximum time allowed before a report must be sent, and a Query interval. Multicast routers which are not the current querier adopt the QQI value from the most recently received Query as their own value.

IGMP_FRAME is the frame format for IGMP. The IPOptions field will be used to set the option for a router alert to cause router to examine every packet. An illustrative embodiment of IGMP_Frame follows:

A transmit path can be defined by maintaining a multicast list. IGMP frames are monitored on outgoing packets. When the packet is an IGMP report, the Group Address field of the IGMP message will be stored into a list of IGMP multicast addresses. When the packet is an IGMP leave, the Group Address field will be removed from the IGMP multicast list.

Since IGMP protocols support previous versions of IGMP, IGMPv2 reports can be sent on a failover to maintain groups for both IGMPv2 and IGMPv3.

An implementation of instructions for multicast list maintenance can add to the multicast list if the list is not full and the request is not already in list and remove from multicast list if the list is not empty and the request is in the list.

NTID will not load balance IGMP messages. Instead all frames with an IP Header type of service which specifies IGMP will be sent out the primary active aggregation group. If the aggregation group is part of a trunk, any one team member from the aggregation can be selected to send the IGMP frame. The aggregation group will then receive all IGMP frames, a necessary behavior to ensure IGMP traffic is always sent down the correct path to the source of a query.

Internet Protocol (IP) multicast is converted to Ethernet multicast. The destination Media Access Control (MAC) address of an IGMP report is a conversion from the multicast IP address. The Ethernet address contains a static value for the first 3 bytes. In an example conversion shown in Table I in FIG. 6, the Ethernet address value is 01-00-5e. The last 3 bytes correspond to the IP address where the 23 least significant bits are counted. For example, the IP address 239.255.255.1 will be converted into an Ethernet address of 01-00-5e-7f-ff-01.

An IP to Ethernet conversion example is shown in Table I of FIG. 6.

All reports will be sent to the ALL_HOSTS address of 224.0.0.1 and the corresponding MAC address of 01-00-5e-00-00-01. The group address in the IGMP portion of the message will contain the particular multicast group which is being joined.

In an example of a failover operation, an algorithm can include several actions. First, an IGMP report is sent for every multicast group in the list out the new primary. Second, a change is made from an old primary to a new primary, for example by changing TxNodeAddress into the MAC address of the new aggregation. Third, an IGMP Leave group is sent for every multicast group in the list on the old primary. Fourth, if the old primary has lost link, a flag is set indicating that the Leave group is pending.

On link restore, Leave group messages are sent out for the entire list for any messages that are pending.

An example of a failover/failback function can change to new primary by changing a transmit node address into a MAC address of a new aggregation.

On link restore, the leave group is sent out to any aggregations which have pending requests.

Various functions can be implemented to perform operations such as maintaining IGMP groups on all configured VLANs in a failover, building an IGMP message as pPacket and includes operations such as Getting a pointer to IGMP frame to be built, calculating IPHeader checksum, and calculating an IGMP checksum. Other functions can calculate the IP checksum and can also use the same technique to calculate the IGMP message checksum.

In some embodiments, an IGMP query may be supported so that NTID sends an IGMP General Query up to the application which triggers a report for all multicast groups. In a possible configuration, the general query can be created by NTID with a 'spoofed' IP and MAC address of the actual Querier on the network. In some environments, security in the operating system or other applications may prevent the message from reaching the application.

In some embodiments, an IGMP cache may be implemented. To ensure the team can maintain connectivity with the multicast group in a failover, NTID will snoop for all IGMP frames on the primary aggregation. NTID will cache the last sent IGMP frame and send the frame in the event of a failover out the primary aggregation, enabling IGMP traffic to continue down the path to the new primary aggregation. The cached packet will disabled or flushed on conditions including an IGMP query received from the router (0x11) and for a condition that the multicast address associated with the cached packet is removed from the multicast list. The IGMP cache may have difficulty maintaining multiple groups. Multiple reports may be sent for multiple groups which means only caching the last report may not maintain all groups.

The illustrative failover techniques include status awareness operations such as membership tracking or status updates that enable performance improvement over techniques that do not maintain status information. For example, methods may simply transmit IGMP Join messages out of the current primary team member that are generated by a high level protocol stack. Failure of the primary team member and election of a new primary team member will cause the multicast flow to fail to be received by the team.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer system comprising:
   processing resources configured to control and communicate with at least one network device;
   a plurality of network resources coupled by links between the processing resources and the at least one network device; and
   teaming drivers and/or applications executable on the processing resources and adapted to manage redundant Internet Protocol (IP) Multicast traffic flow on a group of network resources comprising operating the network resource group as a single virtual interface controller, determining network connectivity of network resources within the network resource group, and responding to failure of a network resource that is actively receiving the IP Multicast traffic flow by initiating failover of the IP Multicast traffic flow to another network resource within the network resource group that has current network connectivity.

2. The computer system according to claim 1 further comprising:
   the teaming drivers and/or applications adapted to track membership of network resources in the network resource group on a per Multicast flow basis.

3. The computer system according to claim 1 further comprising:
   the teaming drivers and/or applications adapted to maintain a list of Multicast Internet Protocol (IP) addresses at which the Multicast flow is received.

4. The computer system according to claim 1 further comprising:
   the teaming drivers and/or applications adapted to initiate failover of the actively received IP Multicast traffic flow by communicating via Internet Group Management Protocol (IGMP) a request to assign the IP Multicast traffic flow from a first to a second network resource.

5. The computer system according to claim 1 further comprising:
   the teaming drivers and/or applications adapted to respond to failure of a network resource by communicating via Internet Group Management Protocol (IGMP) a general query that requests an Internet Protocol (IP) stack to send an IGMP join message and identifies an IP Multicast traffic flow to be received, receiving IGMP join messages responsive to the general query, and transmitting the received IGMP join messages.

6. The computer system according to claim 5 further comprising:
   the teaming drivers and/or applications adapted to monitor Internet Group Management Protocol (IGMP) traffic, maintain a list of joined multicast streams based on the monitored IGMP traffic, and in response to failover, adapted to send at least one Internet Group Management Protocol (IGMP) report that contains the list of joined multicast streams out a primary aggregation group, and retain joined groups on non-primary aggregation groups.

7. The computer system according to claim 6 further comprising:
   the teaming drivers and/or applications adapted to join the multicast streams on a new primary aggregation group before failover from a previous aggregation group and, after failover, adapted to send at least one leave group message from the previous primary aggregation group, ensuring termination of the multicast streams.

8. The computer system according to claim 7 further comprising:
   the teaming drivers and/or applications adapted to realize a failover condition and determine link connectivity;
   for a connected link, the teaming drivers and/or applications are adapted to send at least one Internet Group Management Protocol (IGMP) Leave Group message whereby the multicast streams to ports outside the new primary aggregation group are terminated; and
   for a disconnected link, the teaming drivers and/or applications are adapted to set an indication directed to the previous primary aggregation group indicative that an Internet Group Management Protocol (IGMP) Leave Group message is pending, realize renewed link connectivity, and send at least one Internet Group Management Protocol (IGMP) Leave Group message whereby the multicast streams to ports outside the new primary aggregation group are terminated.

9. The computer system according to claim 8 further comprising:
   the teaming drivers and/or applications adapted to snoop Internet Group Management Protocol (IGMP) frames on the primary aggregation group, cache a last sent of the IGMP frames, realize a failover condition, and send the cached last sent of the IGMP frames upon the failover realization enabling Internet Group Management Protocol (IGMP) traffic on the new primary aggregation group.

10. A method of operating a network computer system comprising:
    providing redundant Internet Protocol (IP) Multicast traffic flow on a group of physical ports comprising:
       virtualizing the group of physical ports into a single virtual Network Interface Controller (NIC);
       validating network connectivity in a logical group comprising at least one of the physical ports in the virtualized group; and
       responding to failure of a physical port that is actively receiving on an IP Multicast traffic flow comprising:
          instigating failover of the actively received IP Multicast traffic flow to a physical port in the logical group with validated network connectivity.

11. The method according to claim 10 further comprising:
    validating network connectivity in the logical group comprising:
       tracking membership of physical ports in the logical group on a per Multicast flow basis.

12. The method according to claim 10 further comprising:
    validating network connectivity in the logical group comprising:
       maintaining a list of Multicast Internet Protocol (IP) addresses at which the Multicast flow is received.

13. The method according to claim 10 further comprising:
    instigating failover of the actively received IP Multicast traffic flow comprising:
       communicating via Internet Group Management Protocol (IGMP) a request to assign the IP Multicast traffic flow from a first physical port to a second physical port.

14. The method according to claim 10 further comprising:
    responding to the failure of a physical port comprising:
       communicating via Internet Group Management Protocol (IGMP) a general query that requests an Internet Protocol (IP) stack to send an IGMP join message and identifies an IP Multicast traffic flow to be received;

receiving IGMP join messages responsive to the general query; and transmitting the received IGMP join messages to a switched network.

15. The method according to claim 10 further comprising:

monitoring Internet Group Management Protocol (IGMP) traffic;

maintaining a list of joined multicast streams based on the monitored IGMP traffic;

in response to failover, sending at least one Internet Group Management Protocol (IGMP) report that contains the list of joined multicast streams out a primary aggregation group; and retaining joined groups on non-primary aggregation groups.

16. The method according to claim 15 further comprising:

joining the multicast streams on a new primary aggregation group before failover from a previous aggregation group.

17. The method according to claim 16 further comprising:

after failover, sending at least one leave group message from the previous primary aggregation group, ensuring termination of the multicast streams.

18. The method according to claim 17 further comprising:

realizing a failover condition;

determining link connectivity;

for a connected link, sending at least one Internet Group Management Protocol (IGMP) Leave Group message whereby the multicast streams to ports outside the new primary aggregation group are terminated; and for a disconnected link:

setting an indication directed to the previous primary aggregation group indicative that an Internet Group Management Protocol (IGMP) Leave Group message is pending;

realizing renewed link connectivity; and sending at least one Internet Group Management Protocol (IGMP) Leave Group message whereby the multicast streams to ports outside the new primary aggregation group are terminated.

19. The method according to claim 18 further comprising:

snooping Internet Group Management Protocol (IGMP) frames on the primary aggregation group;

caching a last sent frame of the IGMP frames;

realizing a failover condition; and sending the cached last sent frame of the IGMP frames upon the failover realization enabling Internet Group Management Protocol (IGMP) traffic on the new primary aggregation group.

20. An article of manufacture comprising:

a controller usable medium having a computable readable program code embodied therein adapted to operate a network computer system, the computable readable program code further comprising:

a code adapted to cause the controller to provide redundant Internet Protocol (IP) Multicast traffic flow on a group of physical ports;

a code adapted to cause the controller to virtualize the group of physical ports into a single virtual Network Interface Controller (NIC);

a code adapted to cause the controller to validate network connectivity in a logical group comprising at least one of the physical ports in the virtualized group;

a code adapted to cause the controller to validate network connectivity in a logical group comprising at least one of the physical ports in the virtualized group; and a code adapted to cause the controller to respond to failure of a physical port that is actively receiving on an IP Multicast traffic flow by instigating failover of the actively received IP Multicast traffic flow to a physical port in the logical group with validated network connectivity.

* * * * *